(No Model.)

W. A. McNAIR.
DEVICE FOR REMOVABLY ATTACHING PULLEYS TO DIFFERENT SIZED SHAFTS.

No. 362,767. Patented May 10, 1887.

Witnesses
Eugene E. McNair
Zera Calkins

Inventor
William Alexander McNair

UNITED STATES PATENT OFFICE.

WILLIAM ALEXANDER McNAIR, OF ELSAH, ILLINOIS.

DEVICE FOR REMOVABLY ATTACHING PULLEYS TO DIFFERENT-SIZED SHAFTS.

SPECIFICATION forming part of Letters Patent No. 362,767, dated May 10, 1887.

Application filed July 12, 1886. Serial No. 207,842. (No model.)

*To all whom it may concern:*

Be it known that I, WILLIAM ALEXANDER McNAIR, of the village of Elsah, county of Jersey, State of Illinois, have invented a new Device for Removably Attaching Pulleys and Wheels to Different-Sized Shafts, of which the following is a specification.

This invention consists of a device or mechanism attached to the hub of a pulley, wheel, coupling, or other article in such a manner as to fasten and center itself to different-sized shafts.

Figure 1:
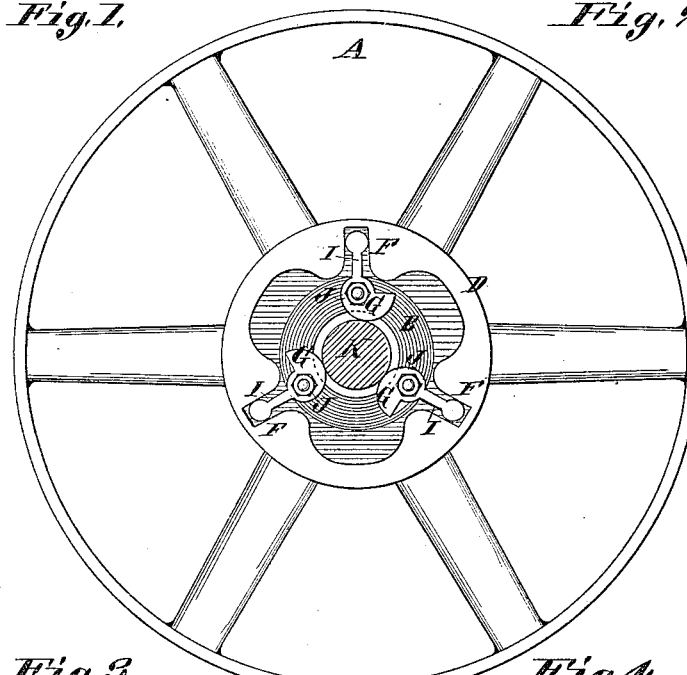
Figure 2:
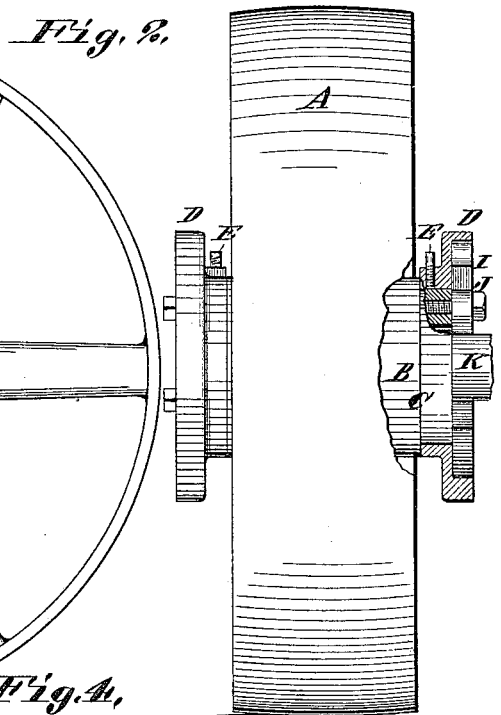
Figure 3:
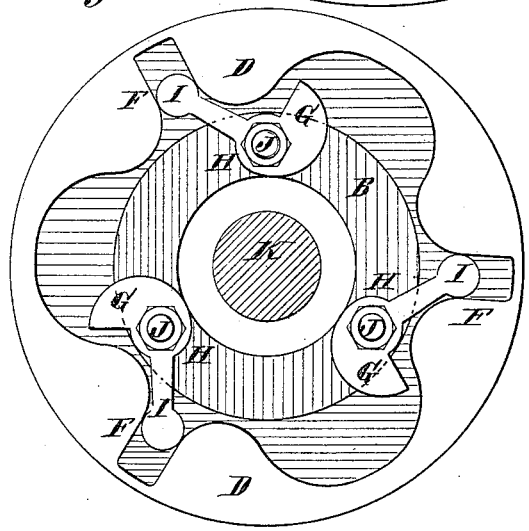
Figure 4:
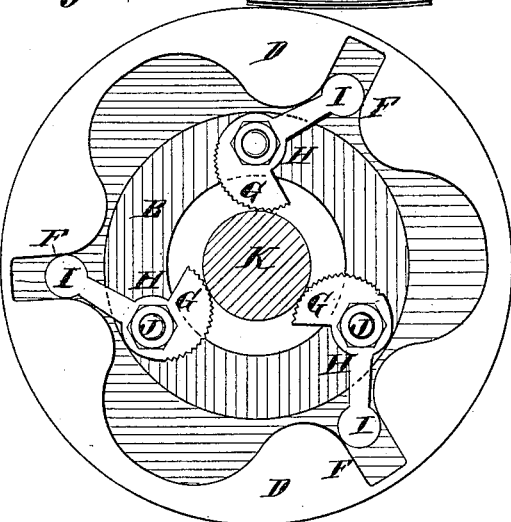

In the accompanying drawings, Figure 1 represents a side view with attachment in position, holding the pulley in place on shaft. Fig. 2 is an edge view showing clutch-ring in section on one side and elevation on the other. Fig. 3 shows cams open ready to receive shaft. Fig. 4 shows cams closed with the serrated faces impinging on the shaft, thereby holding pulley, wheel, coupling, &c., to place.

Similar letters refer to similar parts throughout the several views.

The object of my invention is to provide a mechanism that will obviate the necessity of boring the pulleys, wheels, couplings, &c., and allow those that are already made to be used on shafts of any size smaller than their bore. This is accomplished by casting the hole in hub B large enough to receive with ease the largest-sized shaft it is designed to go on, then by turning the periphery and end of hub B true to the center of pulley, wheel, coupling, &c., and making clutch-ring D to fit on the turned part of hub B back to shoulder C, Fig. 2, and extending or projecting over past the end of hub B far enough to receive and stand flush with the arms of cams I, as shown in Fig. 2, forming a slot or guide, F, by which the cams G H I are worked by the revolving of clutch-ring D.

The cams G H I are hung on pivots J, that are fast in hub B, true with the center of pulley, wheel, coupling, &c., so that when operated by clutch-ring D they hang the pulley, wheel, coupling, &c., true, and hold it fast by contact of the serrated faces of cams G impinging on shaft or other article to be fastened to. They are forced to place by clutch-ring D operating on arm I by revolving said ring until the cams G H I are forced firmly to place, when clutch-ring D is secured to its place by set-screw E, as shown in Fig. 2. There are three or more cams, G, H, and I, which are held to their place on pivot J, so they can be replaced with larger cams or reversed to drive in different directions.

What I claim as my invention, and desire to secure by Letters Patent, is—

The combination, with a wheel or pulley, of a ring having cam-grooves and cams adapted to be secured to the hub and to be operated by the cam-grooves to secure the wheel or pulley to different-sized shafts, substantially as described.

WILLIAM ALEXANDER McNAIR.

Witnesses:
EUGENE E. McNAIR,
ZERA CALKINS.